United States Patent

[11] 3,588,617

[72] Inventors Alfred Grozinger
Stuttgart-Degerloch;
Rolf Wohr, Leonberg, Eltingen, Germany

[21] Appl. No. 808,198
[22] Filed Mar. 18, 1969
[45] Patented June 28, 1971
[73] Assignee Robert Bosch GmbH
Stuttgart, Germany
[32] Priority Apr. 11, 1968
[33] Germany
[31] P 17 63 157.1

[54] ELECTRICAL CIRCUIT STRUCTURE, AND PARTICULARLY VOLTAGE REGULATOR STRUCTURE FOR AUTOMOTIVE VEHICLE USE
7 Claims, 16 Drawing Figs.

[52] U.S. Cl. .......... 317/101,
29/624, 29/623, 338/312, 338/308
[51] Int. Cl. .......... H05k 1/04
[50] Field of Search .......... 317/100,
101 (A), 101 (CD), 101 (CC), 129; 29/626, 624;
338/51, 312, 116, 308 (Cursory)

[56] References Cited

UNITED STATES PATENTS

| | | | |
|---|---|---|---|
| 2,863,974 | 12/1958 | Zabel et al. .......... | 317/100 |
| 3,162,788 | 12/1964 | Allen et al. .......... | 317/101CC(UX) |
| 3,214,536 | 10/1965 | Wallace .......... | 29/624 |
| 3,216,089 | 11/1965 | Dettman .......... | 317/101CW(UX) |
| 3,359,360 | 12/1967 | Owings .......... | 29/626(UX) |
| 3,409,856 | 11/1968 | Meoni .......... | 338/312 |

*Primary Examiner*—David Smith, Jr.
*Attorney*—Flynn and Frishauf

ABSTRACT: Semiconductor elements and passive electrical network elements are placed on interconnecting sheet metal conductor units which have holes punched therein to receive connecting leads, and extending tabs punched out, the tabs being bent over to hold a ceramic resistance substrate plate thereto, and, if extending, forming attachment tabs or lugs for other circuit connections. The entire structure is encapsulated in a potting compound, the resistance plate being parallel to the plate-like conductor units so that differential expansion upon wide temperature swings (for example −40°C to 110°C) will not transfer stresses differentially to the ceramic resistance plate and the other elements and conductor units thus causing loosening of connections.

INVENTORS
Alfred GRÖZINGER
Rolf WÖHR
BY [signature]
their ATTORNEYS

INVENTORS
Alfred GRÖZINGER
Rolf WÖHR
BY their ATTORNEY

INVENTORS
Alfred GRÖZINGER
Rolf WÖHR
BY their ATTORNEY

INVENTORS
Alfred GRÖZINGER
Rolf WÖHR
BY their ATTORNEY

INVENTOR
Alfred GRÖZINGER
Rolf WÖHR

BY their ATTORNEY

INVENTORS
Alfred GRÖZINGER
Rolf WÖHR
BY their ATTORNEY

ELECTRICAL CIRCUIT STRUCTURE, AND PARTICULARLY VOLTAGE REGULATOR STRUCTURE FOR AUTOMOTIVE VEHICLE USE

The present invention relates to a voltage regulator, and more particularly to a voltage regulator for automotive use to control the output voltage of an alternator, and utilizing semiconductor elements interconnected with other electrical circuit elements into a unitary component.

Semiconductor-type voltage regulators are known (see, for example, Austrian Pat. No. 246,275), and particularly in which the interconnections for the electrical elements are formed as printed circuits, deposited on a carrier plate of insulating material, the individual electrical elements being soldered to the printed circuit. If such a voltage regulator is totally encapsulated in a plastic, temperature changes causing differential expansion, and contraction of the encapsulating compound and the printed circuit, and its components subject the assembly to mechanical stresses, which may cause its destruction. Automotive use, in which temperature variations from between −30° C. to +80° C. can be expected place severe operating requirements on the voltage regulator which, additionally, should have the highest degree of reliability. Manufacture of printed circuits which can withstand the stresses under such conditions are expensive and not suitable for mass production.

It is an object of the present invention to provide a voltage regulator structure which is adapted for use in an automotive vehicle, and to be totally encapsulated, while being resistant against deformation, or damage due to wide swings in ambient temperature.

SUBJECT MATTER OF THE PRESENT INVENTION

Briefly, semiconductor elements and passive electrical elements and components are interconnected by means of a sheet metal plate which has an elongated slit cut therein, the plate being severed into a plurality of conductor units and formed with tabs which extend at right angles from the plate to form connection points to at least some of the elements to be used in the voltage regulator, and further being formed with openings to receive terminal leads from others of such electrical elements. Such a construction is inexpensive and lends itself to automatic assembly of components; all conductor strips can be made in one, or sequential punching operations which are fast, and inexpensive, and the resulting structure is strong enough to be essentially insensitive to temperature swings. Further, the entire assembly may be made very small, for example in a plane area of 3×5 cm., utilizing sheet metal of a thickness of 0.3 mm.

In accordance with a feature of the invention, at least some of the resistance units to be used in the voltage regulator are assembled on a common, preferably ceramic substrate, the substrate being connected to the sheet metal plate at bent over tabs. The substrate will thus be parallel to the sheet metal plate and expansion and contraction of the encapsulating compound will not place stresses on the connection between metal plate and ceramic resistance substrate since any layer of encapsulating compound between the metal plate and the ceramic substrate will be very thin.

The invention will be described by way of example with reference to the accompanying drawings, wherein.

Figure 1:
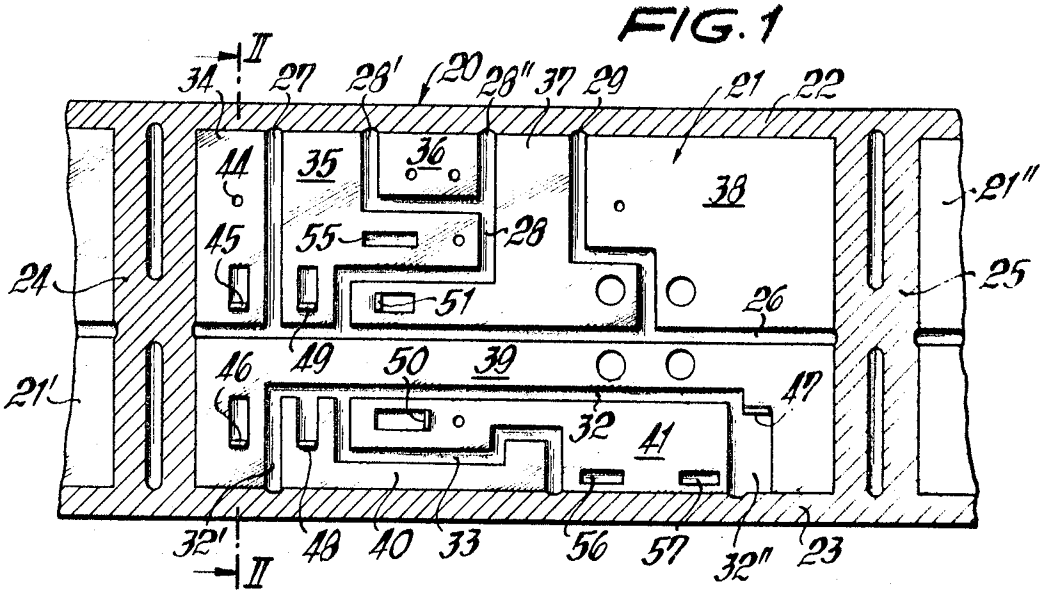
FIG. 1 is a top plan view of a punched sheet metal element before any electronic components are mounted thereon.

Referring now to FIG. 1: A sheet metal strip 20, for example of outside dimensions of 3×5 cm., and shown enlarged in the drawings, is punched with linear openings to separate the strip into a group of fields 21′, 21, 21″. Adjacent fields of the strip will all be identical. During manufacture, the marginal regions 22, 23, 24, 25, shown cross-hatched in FIG. 1, will be removed so that only the sheet metal conducting elements 34, 35, 36, 37, 38, 39, 40, 41 will remain.

A longitudinal punch cut 26 severs the field into a pair of regions; from the longitudinal cut 26, three branches 27, 28, 29 lead to the marginal regions; branch cut 28 branches further into two upper ends 28′, 28″ which terminate in the marginal region 22. A portion of a substantially U-shaped cut 32 (lower half of field 21) extends parallel to central cut 26, terminating in a pair of end arms 32′, 32″ which, in turn, terminate in marginal region 23. A further cut, somewhat S-shaped 33 terminates with one end in cut 32, and with the other in marginal region 23.

The strips 24, 25, when later severed, will provide a group of conductive elements 34—41 each defined by the surrounding cuts, and held together by the electronic components secured thereto. Additional conductive elements 40, 41 will be formed by the cuts 32, 33 when the lower margin 23 is severed. All these elements 34—41 will form the electrical conductors for the regulator and will be finally, electrically formed when the edge strips 22, 23 and the connecting strips 24, 25 are cut away.

Figure 2:
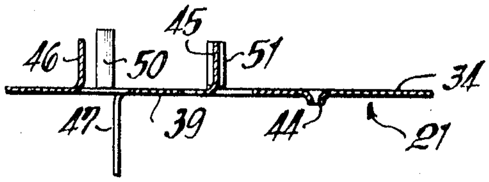
FIG. 2 is a cross section along lines II–II of FIG. 1.
Figure 3:
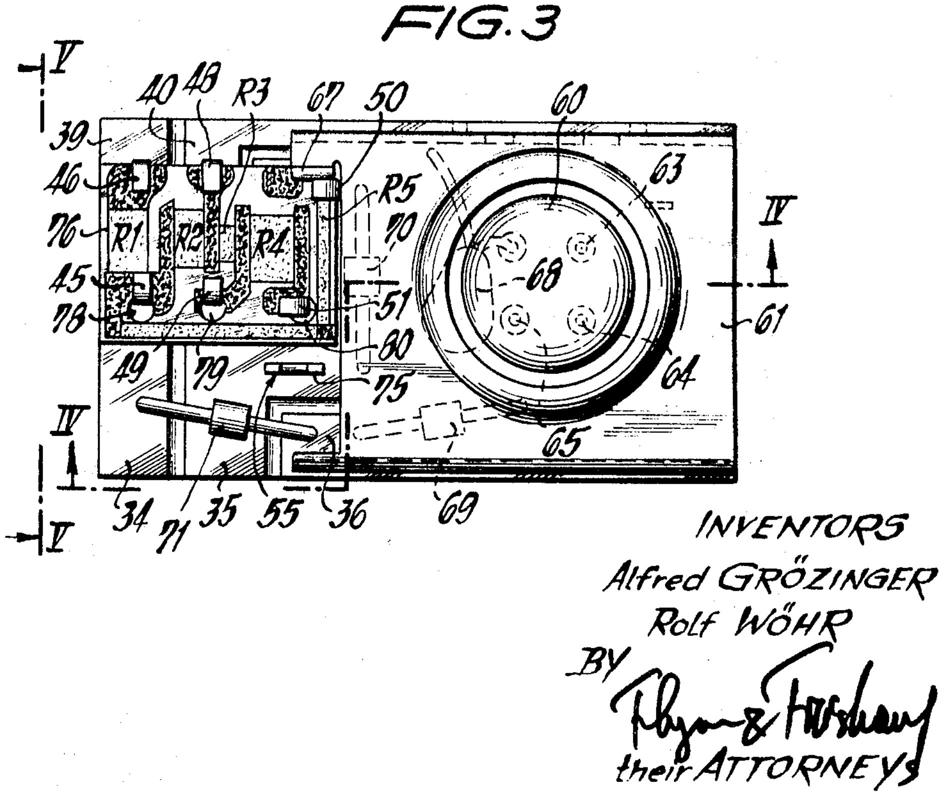
FIG. 3 is a top view of the sheet metal plate with electrical elements mounted thereon.
Figures 4, 5, 7:
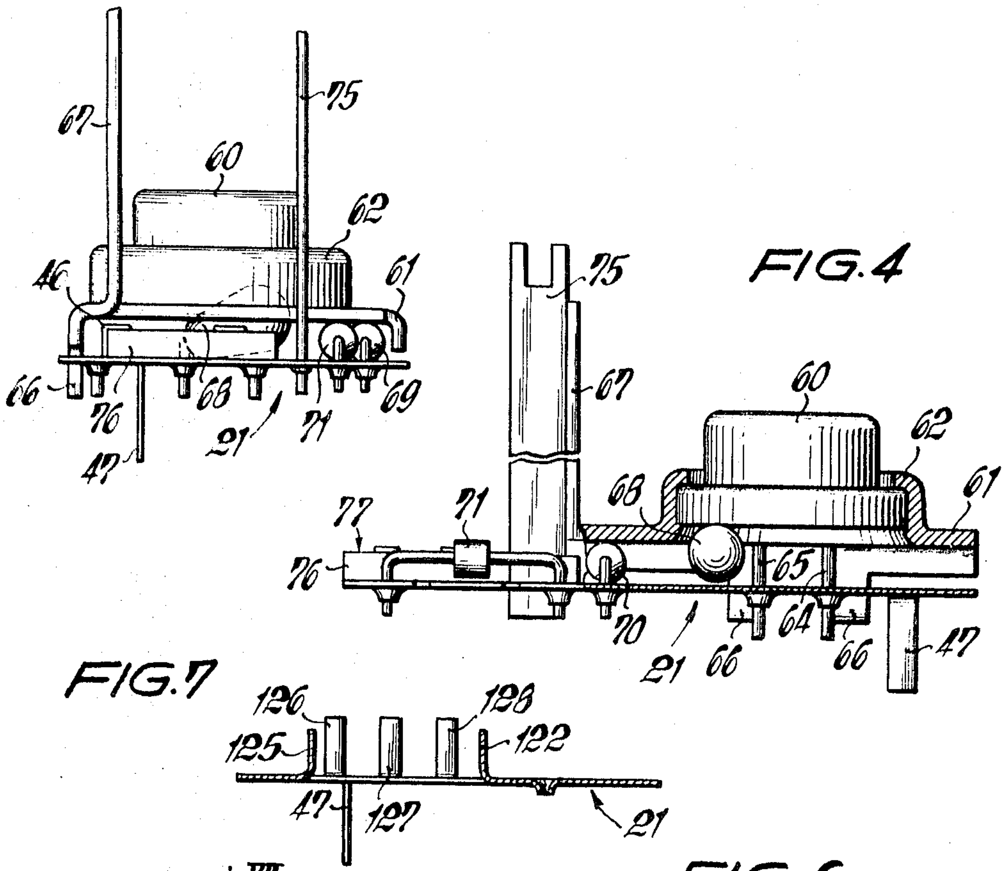
FIG. 4 is a side view, partly in section, along lines IV–IV of FIG. 3.
FIG. 5 is a side view of the assembly of FIG. 3 along lines V–V of FIG. 3.
FIG. 7 is a cross-sectional view along lines VII–VII of FIG. 6.
Figure 6:
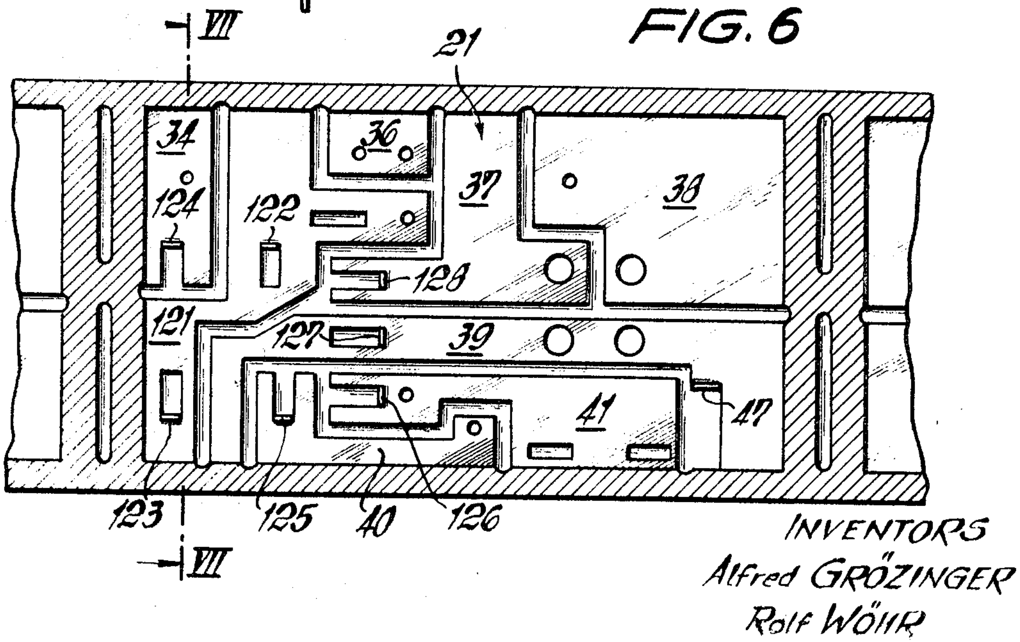
FIG. 6 is a top view, seen from the reverse (bottom) of a different embodiment of the present invention, before assembly of electrical components.

The electronic elements can be connected to the circuit elements in various ways. For example, circuit region 34 (see FIG. 2) has a hole 44 punched therethrough and a sheet metal tab 45 is punched out and bent over by 90°. A similar tab 46 is punched out from element 39 and likewise bent at right angles. An elongated metal part 47 is bent down adjacent cut 32″. Further tabs 48, 49, 50, 51 are punched and bent over in the circuit elements 40, 35, 41 and 37, respectively. The three tabs 45, 49, 51 are all in line; tabs 46 and 48 are located in a line parallel thereto. Element 35 has a rectangular opening 55 and element 41 a pair of rectangular openings 56, 57. As can be seen in FIG. 2, tabs 45, 46, 48, 49, 50 and 51 extend in an upward direction, whereas tab 47 extends downwardly, in the opposite direction. FIGS. 3—5 illustrate a field 21 after the electrical components are assembled thereto. They are soldered to the various circuit elements and hold them together.

Figure 16:
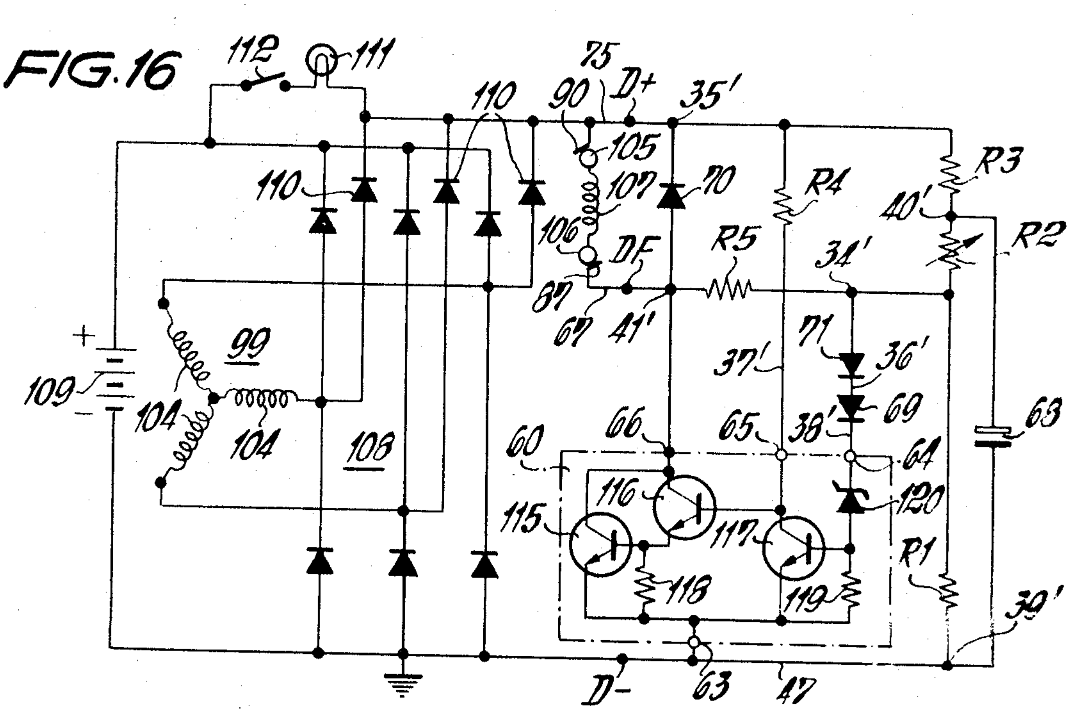
FIG. 16 is a circuit diagram of the voltage regulator, illustrating its combination with a battery and an automotive-type alternator.

All active semiconductor elements, as illustrated in the circuit diagram of FIG. 16, are enclosed in a single transistor housing 60, which is connected by an edge to a cooling flange 61, which is bent over at its upper edge 62 (FIG. 4). The three connecting pins 63, 64, 65, extending from transistor housing 60, are connected to the circuit elements 37, 38, 39 of field 21. Cooling flange 61 is soldered at one edge 66 in the rectangular openings 56 and 57. Cooling flange 61 further has an upwardly extending, bent-up part 67 (FIG. 4). A condenser 68 is located beneath cooling flange 61 and connected with one terminal to circuit element 39, and with the other to circuit element 40. Three diodes 69, 70, 71 are connected between the circuit elements: diode 69 between elements 36 and 38, diode 70 between elements 35 and 41, and diode 71 between elements 34 and 36. A connecting tab 75 is soldered into the rectangular opening 55 of element 35, the tab 75 extending parallel to the bent-up part 67 of the transistor housing.

As best seen in FIG. 3, a ceramic plate or substrate 76 has resistance film 77 applied thereto, and is connected by means of six metal tabs 45, 46, 48, 49, 50, 51 to the various circuit elements of field 21. The three tabs 46, 48, 50 are bent over the edge of ceramic plate 76 in such a manner that ceramic plate 76 is retained mechanically and, at the same time, an electrical contact is made to respective positions of the resistance film 77. The three other tabs 45, 49, 51 extend through openings 78, 79, 80 of ceramic plate 76, and are likewise bent over against the surface of the ceramic plate, in order to further retain the ceramic plate in position and additionally provide contact with the resistance film 77.

Resistance film 77 is subdivided into five resistances, R1 to R5; as seen, R1 is connected electrically between elements 39 and 34, R2 between elements 34 and 40, R3 between elements 35 and 40, R4 between elements 35 and 37, and R5 between elements 41 and 34.

FIGS. 3 to 5 already illustrate the entire assembly with the marginal strips 22, 23, as well as separating strips 24, 25 severed from field 21. This severing process is carried out after all elements have been placed on the field, as illustrated in FIG. 1. Preferably, marginal strips 22, 23 are removed by means of a rotating cutoff knife, whereas connecting strips 24, 25 are punched off. Before severing the marginal and the connecting strips, all electrical elements are soldered to the electrical elements of the field by means of dip-soldering. All these manufacturing steps are well known and not further illustrated.

Figure 14:
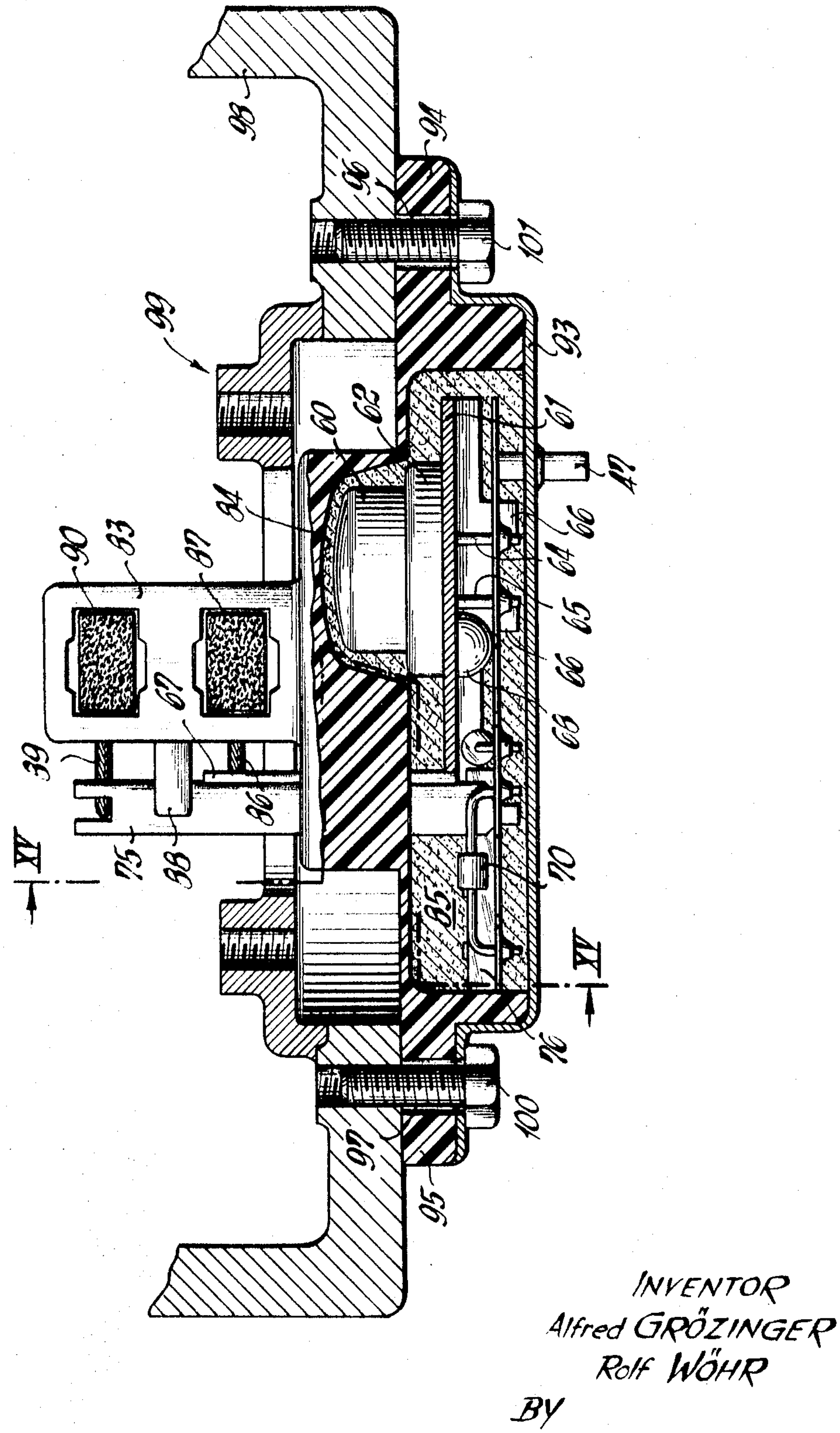
FIG. 14 is a partial cross-sectional view of an automotive generator end housing, illustrating assembly of the voltage regulator thereto.
Figure 15:
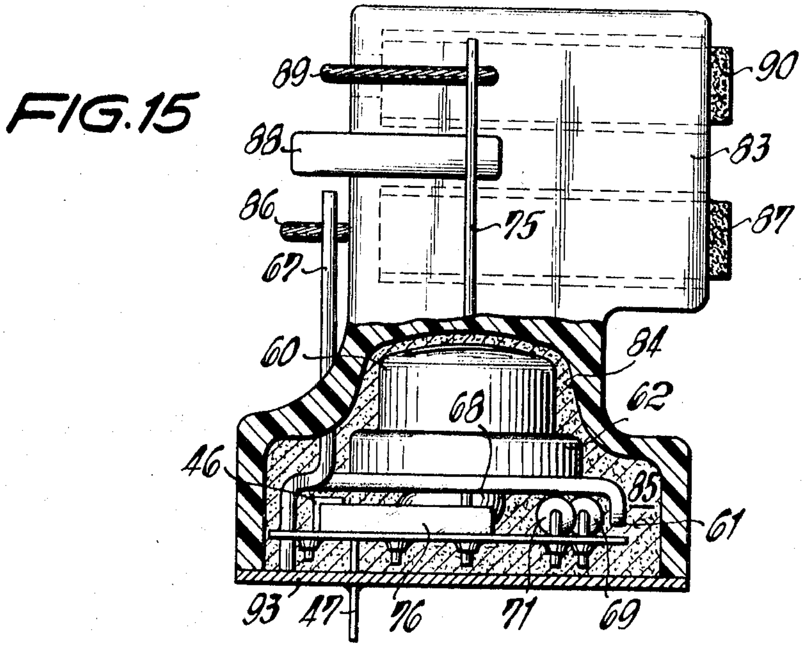
FIG. 15 is a side view, partly in section, of the voltage regulator combined with a slip ring brush holder, for use in the generator of FIG. 14.

FIGS. 14 to 15 illustrate the assembly of a complete unit in a cavity 84 formed in a brush holder assembly 83, for assembly into an alternator structure. The cavity 84, after assembly of the regulator therein, is completely filled by means of an encapsulating compound 85, such as an epoxy compound, which places the various elements in position and protects them against mechanical and chemical attack. The sheet metal part 67 and tab 75 extend through a pair of suitable openings in brush holder 83, completely sealed, as best seen in FIG. 15. The connecting pigtail 86 of a brush 87 soldered to tab 67; tab 75, retained in position by a projection 88 on the brush holder, against which the tab can bear, has the pigtail 89 of brush 90 soldered thereto. Brushes 87 and 90 are guided in suitable openings of the brush holder.

After the encapsulating compound has been poured into the cavity, only tab 47 will extend therefrom. This is the chassis connection of the voltage regulator. A metal cover 93 is placed over cavity 84, now completely filled with encapsulating compound. Cover 93 is electrically connected to the metal tab 47 and extends to a pair of lateral attachment flanges 94, 95, formed with holes 96, 97 through which the metal cover 93 is connected by means of screws 100, 101, electrically, as well as mechanically to the end bell 98 of the alternator, and thus with chassis.

The electrical circuit diagram of the voltage regulator is seen in FIG. 16. An alternator 99, having three star-connected phase windings 104, is excited by a field winding 107, supplied over slip rings 105, 106 against which the brushes bear. The three phase windings 104 supply a three phase-bridge rectifier 108, connected to a battery 109; additionally, three rectifiers 110 (which may be of smaller current capacity and thus are indicated in smaller size than the diodes of the bridge rectifier) supply field winding 107. Current in field winding 107 is periodically interrupted by the voltage regulator, the average current then determining the field strength and thus the output voltage of alternator 99. The electrical control action of such alternators is well known. Ignition switch 112, in series with an ignition control lamp 111 connects from the positive bus of the field winding 75 to the battery.

The voltage regulator is connected to the three rectifiers 110 by means of a plug connection, not illustrated in FIGS. 14 and 15, and electrically shown in FIG. 16 as D+. It is further connected to tab 75 and brush holder 90 and thus to slip ring 105, additionally to electrical connecting element 35, illustrated in FIG. 16 at junction point 35′. Junction point 35′ is further connected to the cathode of shunting diode 70, the anode of which is connected to a junction point 41′, corresponding to electrical circuit element 41, and on the one hand with tab 67, and brush 87 and slip ring 106, and on the other hand with transistor housing 60. Transistor housing 60 includes three NPN-transistors 115, 116, 117, a pair of resistors 118, 119, and a Zener diode 120. The collectors of transistors 115 and 116 are internally connected and to housing 60. The emitter of transistor 116 is connected to the base of transistor 115 and over a resistance 118 with the tab 63 of transistor housing 60, which electrically is connected to a junction point 39′, corresponding to electrical connecting element 39. Additionally, there is a connection over tab 47, metal cover 93 and over screws 100, 101 to the chassis of generator 99. The base of the transistor 116 is connected to the collector of transistor 117 and with extension 65 of housing 60 which is connected over junction point 37′ (corresponding to circuit element 37) and resistance R4 with junction 35′.

The emitter of transistors 115, 117, each, is further connected with extension 63 of the transistor housing, to which also one terminal of a resistance 119 is connected. The other terminal of resistance 119 connects to the base of transistor 117, and to the anode of a Zener diode 120. The cathode of Zener diode 120 is connected to extension 64, and thereby to a junction 38′, corresponding to electrical element 38 and thus to the cathode of a diode 69. The anode of diode 69 connects to junction 36′, corresponding to circuit element 36, and with the cathode of a diode 71. The anode is connected to junction point 34′, corresponding to circuit element 34. Junction point 34′ also connects to resistance R5, which in turn is connected to junction 41′. Additionally, junction 34′ connects to one terminal of resistance R1 and to one terminal of resistance R2. Resistance R1 is additionally connected to the junction 39′, and resistance R2 connects to junction 40′, from which point a condenser 68 connects to junction 39′. The other terminal of condenser 68 is connected over resistance R3 with junction point 35′.

Operation of the circuit in accordance with FIG. 16: Let it be assumed that the output voltage of generator 99 is less than the desired value, then Zener diode 120 will block and transistor 117 will not receive base current, and thus also be blocked. Silicon diodes 69, 71 are used for temperature compensation. Transistors 115, 116 are then fully conductive and current will rise through field winding 107. This causes a rise in generator output voltage, and when Zener diode 120 becomes conductive, causing conduction of transistor 117, transistors 115, 116 will block. Current in the exciter field winding 107 will now continue to flow over diode 70, decreasing exponentially however. This will cause a drop in voltage until Zener diode 120 will, again, block. Feedback resistor R5 provides for abrupt switch-over of the transistor pair 115, 116 from conductive to blocked state.

Another embodiment of the structure of the present invention is illustrated in FIGS. 6—9, which differs essentially from the structure shown in FIGS. 1—5 by the different way of securing the ceramic substrate, with the resistance film thereon to the metal conductive elements. Those parts which are identical to the ones of FIGS. 1—5 are not further described and will have the same reference numerals.

Rather than forming a conductive element 35 and 39, separately, a single common element 121 is used which is formed with a pair of bent-up tabs 122, 123. Conductive element 34 has a tab 124, element 40 has a tab 125, element 41 a tab 126 and the remainder of the portion of element 39 a tab 127. Conductive element 37 has a tab 128 which is punched out and bent upwardly. The ceramic substrate 131 (FIGS. 8 and 9) is secured to the conductive elements by means of the seven metal tabs 122 to 128. As seen, they are bent over at right angles at their upper end in order to reach over ceramic plate 131, and to contact the resistance film 132 secured to the upper side of the substrate 131. The geometric arrangement of the resistances will then differ from the one illustrated in FIG. 3. The heavy, dark surfaces illustrate electrical conductors, assumed to be of practically negligible resistance, and the light-grey surfaces illustrate the resistance strata themselves.

Figure 8:
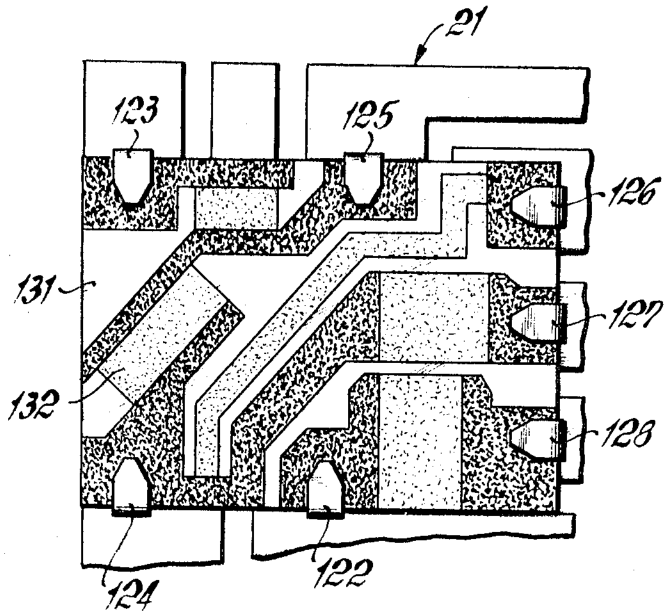
FIG. 8 is a top view of a portion of the plate of FIG. 6, together with a resistance element.
Figure 9:
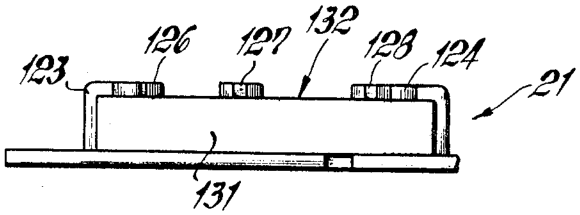
FIG. 9 is a side view of the portion of FIG. 8.

The arrangement of the resistance plate 131, as shown in FIGS. 8 and 9, has the advantage over the arrangement previously discussed and illustrated in FIGS. 1—5 that the openings in the resistance plate can be omitted (see holes 78—80 in plate 76, FIG. 3). Omitting these holes facilitates manufacture and assembly of the ceramic substrate, which may be very small, for example of a dimension 1.2×1.7 cm., which is of a small enough size to be easily damaged. The various metal tabs 122 to 128 are soldered to the conductive paths on plate 131, as before. A special soldering step is necessary since all the remaining elements are soldered together in one operation, from below, by dip-soldering. This special soldering step is undesirable in fully automated assembly.

Figure 11:
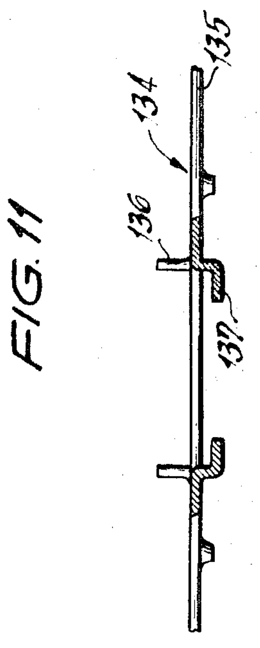
FIG. 11 is a side view along lines XI–XI of FIG. 10.
Figure 10:
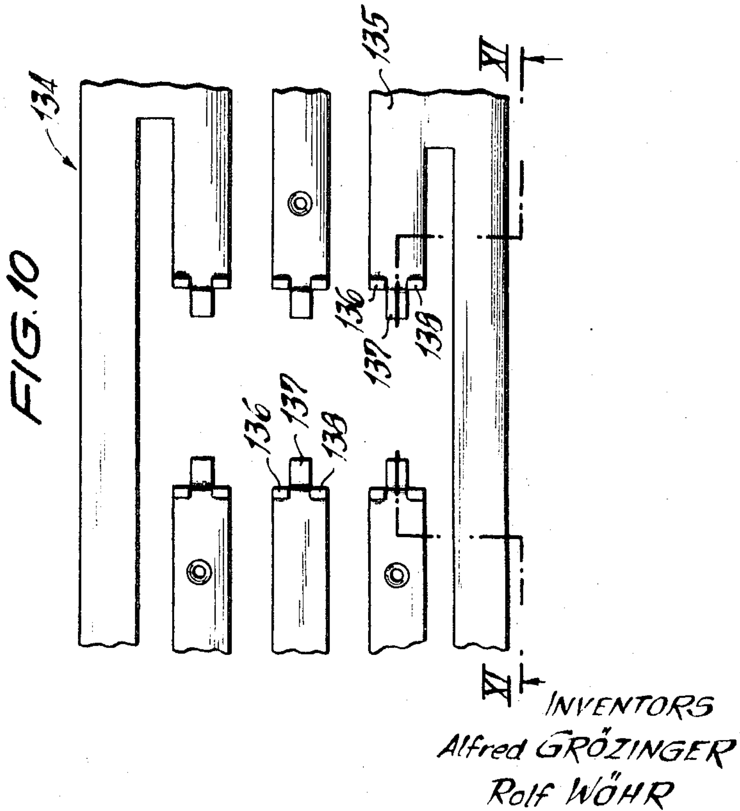
FIG. 10 is a top view of a portion of the sheet metal element, in accordance with another embodiment of the present invention.

The embodiment in accordance with FIGS. 10 to 13 illustrates a solution which permits soldering all elements, including the resistance plate, in one single dip-soldering step. Only the portion of a punched-out conductor element 134 is shown, FIGS. 10 and 11 illustrating the unit before, and FIGS. 12 and 13 after soldering.

Figure 13:
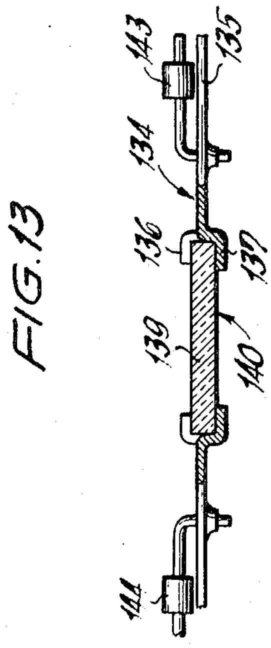
FIG. 13 is a cross-sectional view along lines XIII–XIII of FIG. 12.
Figure 12:
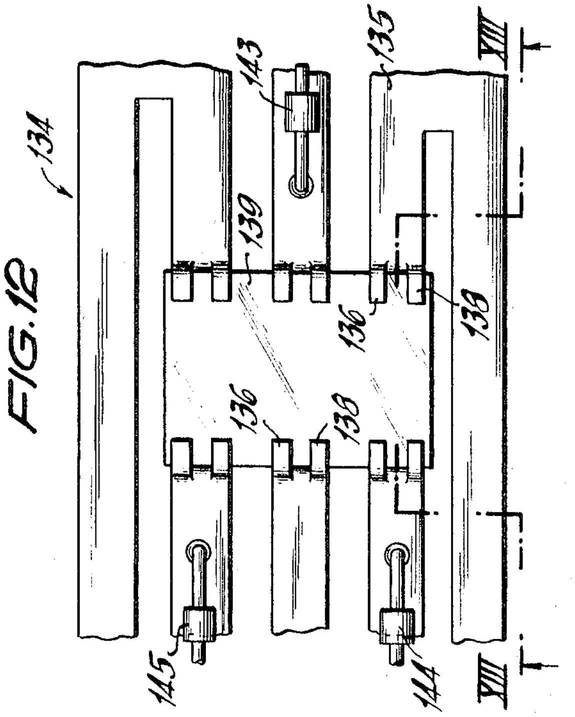
FIG. 12 is a top view of the element of FIG. 10, with a resistance element secured thereto.

The end of the various specially punched regions 135 is subdivided into three horizontal strips 136, 137, 138. Strip 137 is bent downwardly in order to form a bearing surface, and bent over at right angles. Strips 136, 138 extend upwardly in a vertical direction (see FIG. 11). Ceramic plate 139 is then dropped on the bent over ends extending downwardly, the resistance film 140 being at the bottom, that is lower side with respect to the drawings, see FIG. 13. The resistance film 140 will thus bear against strips 137, which are so arranged that the various conductive connections on the ceramic substrate match the strips 137, as best seen in FIGS. 12 and 13. Thereafter, the upwardly extending strips 136, 138 are bent over forwardly against the side of the ceramic plate which does not have any resistance film applied. A secure hold on the plate is thus ensured, while avoiding any possible damage to the resistance film, or to the electrical connection by bending over metal tabs or strips thereagainst after assembly. The various elements 143, 144, 145 are likewise inserted into the conductive elements and together with ceramic plates dip-soldered in one single operation. The resistance layer will not be damaged, and only those regions which are intended to be normally of practically no resistance will be wetted by solder, so that the resistance values will not be changed. If desired, additional resistances for conductive connections can be placed at the top of resistance plate 140, requiring then however an additional soldering step and more care in bending over the strip portions 136, 138 when making connection. The electrical circuit diagram of the voltage regulator in accordance with FIGS. 6—9, or with FIGS. 10—13 can be identical to that previously discussed in connection with FIG. 16.

Connecting electrical resistance plates into conductive strips, as described, provides a reliable, sturdy assembly, which can be used not only for voltage regulators but also for other devices utilizing electronic components, to be assembled to conductive elements. The arrangement is particularly suitable when the electronic components together with the conductive supports are to be encapsulated in an encapsulating compound, since no, or only a very thin film of encapsulating compound will be between the sheet metal field 21 and ceramic substrate 76, or 131, or 139, respectively. This is particularly important when such encapsulated structures are subject to wide temperature swings, for example automotive vehicles when the entire element is built-in together with other components close to the engine so that operating temperature ranges of from −40° C. to 110° C., or even exceeding these ranges, can be expected. The encapsulating compound, usually a synthetic resin, changes its dimensions upon such wide swings and if it, only, were to be used to attach and secure the elements together, the ceramic plate would soon be loose. Securing the ceramic plate to the electrical conductive elements in accordance with the present invention provides utmost operating reliability, since the ceramic plate depends for its attachment to the electrical conductive elements not on any specific holding or locating cavities in the encapsulating compound and further there is no encapsulating compound which can exert destructive stresses on the connections between the ceramic plate and the metal substrates upon differential expansion due to the wide temperature swings.

The present invention has been disclosed and described in connection with an automotive-type voltage regulator but is, of course, also applicable to other electronic components and particularly to equipment subject to wide temperature variation and additionally to mechanical stresses and vibration, as are encountered in operation of a motor vehicle.

We claim:

1. In an electrical circuit structure having an assembly of semiconductor elements and passive electrical circuit elements, and interconnection means to connect said elements in a circuit, the improvement wherein the interconnection means comprises:

a sheet metal plate 21 having elongated narrow slots 26—29 cut therein to sever said plate into a plurality of flat, platelike conductor units 34—41, said platelike conductor units being further formed with punched tabs extending at right angles from said platelike units, to form connections with some of said elements, and said platelike units further being formed with openings to receive terminal leads from others of said elements, said elements being located in planes parallel to said plate-like conductor units, electrically and structurally interconnecting said units and securing said units together in the plane of said plate;

at least some of the elements being resistance elements;

a flat common substrate 76, 131, 139 having said resistance elements applied thereto as layers 77, 132, 140; and said metallic plate being formed with an opening matching the size of said substrate, some of said tabs being bent over perpendicularly from said plate in one direction and some tabs being bent over in the other direction, the ends of said tabs being bent parallel to said plate, said substrate being mounted between said bent over ends of oppositely bent tabs; some of said tabs being electrically connected to the resistance elements on said substrate.

2. Structure according to claim 1 (FIG. 3), wherein said resistance substrate is formed with at least one opening, at least one of said tabs extending through said opening and being bent over 77 said substrate to secure said substrate to said metallic plate.

3. Structure according to claim 1 wherein at least one of said tabs 46 is located against the edge of said substrate 76 and has its free end bent over said substrate to secure said substrate to said metallic plate.

4. Structure according to claim 1 including encapsulating compound encapsulating said conductor units, said plate, and said elements.

5. In a voltage regulator structure comprising an assembly of interconnection means and active and passive electrical circuit elements, the improvement comprising:

a plurality of flat, metallic platelike conductor units located, with gaps, adjacent each other and separated from each other by severing lines, said platelike units being formed with openings having connection leads from some of said elements located therein, and further formed with extending tabs having bent over terminal ends;

at least some of said passive elements including resistances mounted on a common, ceramic plate, said ceramic plate being marginally secured to said platelike units by some of said tabs and held in position parallel to said platelike units by the bent over ends of said tabs and electrically connected by soldering at least some of said bent over ends of said tabs to terminals of said resistances on said plate; and circuit connection tabs secured to at least one of said conductor units.

6. Voltage regulator structure according to claim 5 in combination with a brush holder for an automotive-type alternator, said brush holder having a cavity receiving said encapsulated voltage regulator structure; and a metal plate covering and closing off said cavity, said metal plate being electrically connected to one of said connection tabs.

7. Voltage regulator structure according to claim 5 including encapsulating compound completely encapsulating both sides of said conductor units and electrical connections thereto, and said active and passive elements and leaving exposed only said connection tabs.